(12) United States Patent
Kondoh et al.

(10) Patent No.: US 8,706,996 B2
(45) Date of Patent: Apr. 22, 2014

(54) DATA PROCESSOR

(75) Inventors: Yuki Kondoh, Hino (JP); Tohru Nojiri, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 938 days.

(21) Appl. No.: 12/844,800

(22) Filed: Jul. 27, 2010

(65) Prior Publication Data

US 2011/0055528 A1 Mar. 3, 2011

(30) Foreign Application Priority Data

Aug. 27, 2009 (JP) ................................ 2009-196370

(51) Int. Cl.
*G06F 12/00* (2006.01)
*G06F 13/00* (2006.01)
*G06F 13/28* (2006.01)
*G06F 7/38* (2006.01)
*G06F 9/00* (2006.01)
*G06F 9/44* (2006.01)

(52) U.S. Cl.
USPC ........... 711/163; 711/152; 711/170; 712/229; 718/104

(58) Field of Classification Search
USPC .................. 711/152, 154, 163, 170; 712/229; 718/104
See application file for complete search history.

(56) References Cited

U.S. PATENT DOCUMENTS

| 7,149,862 | B2 * | 12/2006 | Tune et al. ..................... 711/163 |
| 2003/0217250 | A1 * | 11/2003 | Bennett et al. ................ 712/224 |
| 2006/0123416 | A1 * | 6/2006 | Cibrario Bertolotti et al. ... 718/1 |
| 2008/0086729 | A1 * | 4/2008 | Kondoh et al. .................. 718/1 |

FOREIGN PATENT DOCUMENTS

JP 2008-097173 A 4/2008

* cited by examiner

*Primary Examiner* — Ryan Bertram
(74) *Attorney, Agent, or Firm* — Miles & Stockbridge P.C.

(57) ABSTRACT

The data processor can form a system including a combination of two or more operating systems running in parallel, which achieves a higher data transfer rate between operating systems and the increase in system performance without impairing the system reliability. In the system, data transfer between domains is performed in an enhanced access mode as well as an access mode in which an access from a domain manager having control of domains is handled as one from the domain manager. The enhanced access mode is arranged by enhancing, to a CPU scale, an access mode in which an access from the domain manager is treated as an access from a software program working on a domain, and the software program of domain manager transfers data between the domains. For example, in case that the domain manager performs data transfer between domains in the enhanced access mode, a read access from the domain manager is disguised as a read access from a first domain, and a write access from the domain manager is disguised as a write access from a second domain.

12 Claims, 5 Drawing Sheets

Fig.2

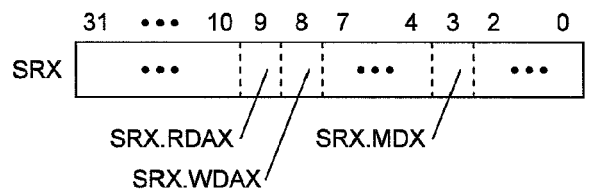

Fig.3

| INSTRUCTION CODE | INSTRUCTION MNEMONIC | OPERATION | EXECUTION PRIVILEGE |
|---|---|---|---|
| H'4m89 | LDC Rm,SRX | Transfer a value of the general-purpose register #m (Rm; m= 0.. 15) to the register SRX. | XVS |
| H'4n88 | STC SRX,Rn | Transfer a value of the register SRX to the general-purpose register #n (Rn; n= 0.. 15). | XVS |
| H'0iCB | TRAPX #imm4 | Set 1 on the register SRX.MDX, and a number of i (i= 0, .., 15) on XVS event code register, and branch to XVS exception vector. | User/Priv, XVS |

Fig.4

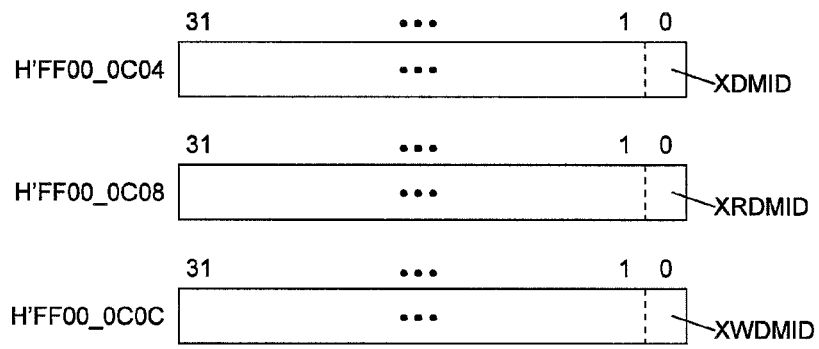

| | SRX.MDX | SRX.RDAX | SRX.WDAX | OPERATING MODE | ACCESS MODE |
|---|---|---|---|---|---|
| 501 | 0 | - | - | User/Priv, DMID=XDMID | User/Priv, DMID=XDMID |
| 502 | 1 | 1 | 1 | XVS | XVS |
| 503 | 1 | 0 | 1 | XVS | (Read) User/Priv, DMID=XRDMID<br>(Write) XVS |
| 504 | 1 | 1 | 0 | XVS | (Read) XVS<br>(Write) User/Priv, DMID=XWDMID |
| 505 | 1 | 0 | 0 | XVS | (Read) User/Priv, DMID=XRDMID<br>(Write) User/Priv, DMID=XWDMID |

DATA PROCESSOR

CLAIM OF PRIORITY

The Present application claims priority from Japanese application JP 2009-196370 filed on Aug. 27, 2009, the content of which is hereby incorporated by reference into this application.

FIELD OF THE INVENTION

The present invention relates to a data processor having an access protection mechanism. Particularly, it relates to a technique useful in application to a microcomputer which enables systems (virtual machines) executing software programs under the controls of different operating systems to work mutually in cooperation.

BACKGROUND OF THE INVENTION

In regard to today's data processors and systems including data processors, functions that application software programs working on such systems are required to include have become increasingly sophisticated and complicated as the integration of LSI or semiconductor IC rises with the downsizing thereof.

It is common that in development of a more sophisticated application software program, existing ones are leveraged and combined in terms of the development efficiency.

In such a case, the existing application software programs refer to the ones which work on conventional systems including conventional data processors, and therefore they are not independent of the configurations of the conventional systems. Changing a system configuration needs a large number of steps for development, however it is less than required for redevelopment of an existing application software program.

Therefore, in most cases an existing application software program needs to be run on a conventional system. To run existing application software programs in combination, conventional systems per se must be worked in combination.

Now, a conventional system cited here refers to a system including one CPU (Central Processing Unit) and one OS (Operating System) in general. "To work conventional systems in combination" means to operate particularly a wide variety of Operating systems in combination and in parallel.

In this connection, Japanese Unexamined Patent Publication No. JP-A-2008-097173 discloses a technique for making a combination of operating systems of conventional systems to operate the systems while keeping the reliabilities and securities thereof.

SUMMARY OF THE INVENTION

The technique disclosed by the JP-A-2008-097173 aims at operating two or more conventional systems such that respective existing application software programs are run thereon. To materialize a sophisticated application software program, it is required to link two or more existing application software programs to work in cooperation with each other.

Especially, for materialization of two or more existing application software programs working in cooperation, it is important, in terms of performance and functionality, that data can be exchanged between system blocks (i.e. virtual machines) at high speed. To achieve a balance between such cooperation and the system reliability, a software program which manages the system blocks must do such data exchange. The system blocks represent the virtual machines described in JP-A-2008-097173. Such virtual machine shall be herein referred to as "domain". The software program which manages the system blocks is a domain manager having control of the domains, and it is referred to as "virtual machine manager" in JP-A-2008-097173. The domain manager is regarded as a software program located in a higher level of the hierarchy of an operating system.

Data to exchange between domains are placed under the controls of operating systems working on source and destination domains of data transfer. For the sake of system reliability, a domain manager should handle such data exchange. However, sometimes it is difficult for a domain manager to access data to exchange. In such a case, it is difficult to transfer data between domains, which becomes a problem consequently. This is because access protection is performed on an individual domain basis. For example, a cause which presents difficulty to a domain manager in accessing data to exchange is that operating systems working on source and destination domains of data transfer perform virtual memorization independently. A virtual memory unit for such virtual memory translates a virtual address for access issued by CPU into a physical address, and performs access protection based on its access right in parallel with the translation, whereby the correspondence to an actual address of a memory or the like is made more flexible, and the efficiency of memory management is increased. The settings of address translation and access right are made by an operating system working on a domain, and it is difficult for a domain manager to control them.

Therefore, it is an object of the invention to provide a data processor which enables a domain manager to make an access in cooperation with a domain without being prevented by access protection on the domain even while the domain access protection is kept.

More specifically, it is an object of the invention to provide a data processor which achieves a higher rate of data transfer between domains differently subjected to access protection while making good use of the access protection mechanism.

The above and other objects of the invention and novel features thereof will become apparent from the description hereof and the accompanying drawings.

Of embodiments of the invention herein disclosed, a representative embodiment will be briefly outlined below.

According to the embodiment of the invention, data transfer between domains is performed in an enhanced access mode as well as an access mode in which an access from a domain manager having control of domains is handled as an access from the domain manager. The enhanced access mode is arranged by enhancing, to a CPU scale, an access mode in which an access from the domain manager is treated as an access made by a software program working on a domain, in which a software program of the domain manager conducts data transfer between the domains. For example, an access mode is enhanced so that a read access from the domain manager is disguised as a read access from a first domain, and a write access from the domain manager is disguised as a write access from a second domain is enhanced. Thus, the domain manager can read data from a memory region to which the first domain provides access protection, and write the read data in a memory region to which the second domain offers access protection.

Now, the effect achieved by the preferred embodiment will be briefly described below.

That is, a domain manager can make an access in cooperation with a domain without being prevented by access protection on the domain even while the domain access protection is kept. Also, it is possible to achieve a higher rate of data transfer between domains differently subjected to access protection while making good use of the access protection mechanism.

BRIEF DESCRIPTION OF THE DRAWINGS

FIG. 2 is a diagram for explaining an example of the layout of registers SRX.MDX, SRX.RDAX and SRX.WDAX;

FIG. 3 is a list showing examples of instructions controlling the register SRX;

FIG. 4 is a diagram showing examples of structures of the registers XDMID, XRDMID and XWDMID;

DETAILED DESCRIPTION OF THE PREFERRED EMBODIMENTS

Figure 1:
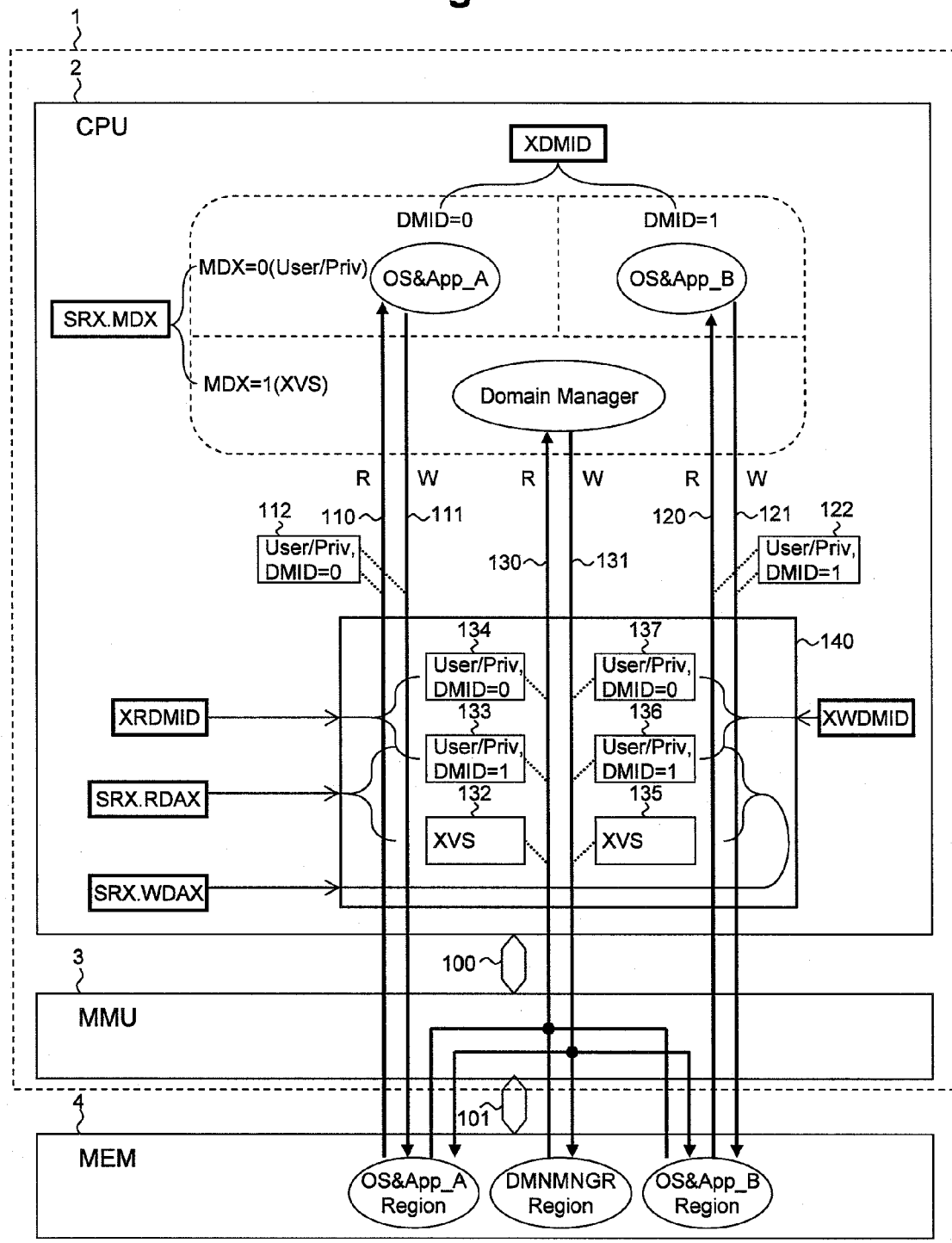
FIG. 1 is a block diagram showing an example of the configuration of a data processor according to an embodiment of the invention.

1. Brief description of the preferred embodiments

A preferred embodiment of the invention herein disclosed will be outlined first. Here, the reference numerals, characters and signs for reference to the drawings, which are accompanied with paired round brackets, only exemplify what the concepts of members or components referred to by the numerals, characters and signs contain.

[1] A data processor (1) according to a preferred embodiment of the invention has a CPU operable to run a software program (2) and an access protection unit operable to provide an access protection to an address space of the CPU based on an operating mode of the CPU. The data processor further includes: a domain ID register (XDMID) on which domain ID data for specifying which operating system to run a software program under is set; a domain control register (SRX.MDX) on which mode data for specifying whether to run the software program specified by the domain ID register or to perform management & control for running the software program specified by the domain ID register is set; and a group of attribute information change registers (XRDMID, XWDMID, SRX.RDAX and SRX.WDAX) on which attribute-change data for changing attribute information (132, 135) of the CPU operating mode depending on settings of the domain control register and domain ID register on condition that the domain control register specifies execution of the management & control are set. The access protection unit receives attribute information (132, 133, 134, 135, 136, 137) from the CPU and judges the validity of an access, provided that the attribute-change data set on the attribute information change registers are incorporated in the attribute information.

According to the embodiment, an access from the domain manager which performs the management & control is disguised as an access made by a software program running on the domain according to attribute-change data set on the attribute information change registers, and therefore a domain manager can make an access in cooperation with a domain without being prevented by access protection on the domain even while the domain access protection is kept.

[2] In regard to the data processor as described in [1], the attribute-change data include e.g. first data (SRX.RDAX=0 or 1, and SRX.WDAX=0 or 1) for switching the attribute information from the management & control to the run of the software program specified by the domain ID register, and second data (XRDMID=0 or 1, and XWDMID=0 or 1) for specifying which domain ID to switch the attribute information to. According to the embodiment, it is possible to appropriately specify a mode for switching the right attribute.

[3] In regard to the data processor as described in [2], the first and second data are data for independently specifying changes of the attribute information for each of read and write accesses, for example.

According to the arrangement, the domain manager can read data from a memory region to which the first domain provides an access protection, and write the read data in a memory region to which the second domain provides access protection by changing the attribute information, for example, so as to disguise a read access from the domain manager as a read access from the first domain, and a write access from the domain manager as a write access from the second domain. Thus, a higher rate of data transfer can be achieved between domains different in access protection while advantage of the access protection mechanism is taken and therefore, the performance of a system including two or more domains can be enhanced by a combination of existing application software programs which utilize the access protection mechanism.

[4] In regard to the data processor as described in any one of [1] to [3], the CPU has an instruction set including e.g. a given load instruction (LDC Rm,SRX) for loading data into the domain ID register, domain control register, and attribute information change register, and a requirement for execution of the load instruction is that the management & control is specified by the domain control register. According to the arrangement, the domain manager can make settings on the domain ID register, domain control register and attribute information change register, as a software program in a higher level of the hierarchy of an operating system.

[5] In regard to the data processor as described in [4], the instruction set of the CPU includes e.g. a given store instruction (STC SRX,Rn) for storing data from the domain ID register, domain control register and attribute information change register, and a requirement for execution of the store instruction is that the management & control is specified by the domain control register. According to the arrangement, the domain manager can save contents of the domain ID register, domain control register and attribute information change register as a software program in a higher level of the hierarchy of an operating system.

[6] In regard to the data processor as described in [5], the instruction set of the CPU includes e.g. a trap instruction (TRAPX #imm4) for setting mode data for specifying the management & control on the domain control register, and then causing a request for an exception handling, and execution of the trap instruction is independent of a setting of the domain control register. According to the arrangement, the process execution can be readily shifted to the management & control by the domain manager in case that a certain domain needs data from another domain.

[7] In regard to the data processor as described in any one of [1] to [6], the access protection unit is an MMU (Memory Management Unit) which has attribute information (MDX, DMID) of an operating mode of a CPU permitted to access a virtual address (VPN[31:24]), and which is operable to translate a virtual address of a CPU into a physical address using a translation pair of the virtual address concerned and physical address (PPN[31:24]), and to judge the validity of an access based on whether or not attribute information of an operating mode of a CPU permitted to access to the virtual address of the translation pair matches attribute information of an operating mode of a CPU making the access to the virtual address. The invention is applicable to a system for which a virtual memory is adopted.

[8] In regard to the data processor as described in [7], the MMU has e.g. an address translation table. In the address translation table, entry data containing a translation pair of virtual and physical addresses, and attribute information of an operating mode of a CPU permitted to access a virtual address concerned are stored rewritably.

[9] In regard to the data processor as described in [8], on condition that attribute information is changed according to attribute-change data set on the attribute information change register, and the CPU performs the management & control according to a setting of the domain control register, if the MMU causes a request for address translation table miss exception handling in response to occurrence of an address translation miss, the CPU responds to the request for address translation table miss exception handling, thereby e.g. to set, on the domain ID register, domain ID data for specifying a domain ID to change the attribute information to by use of the attribute information change register, to set, on the domain control register, mode data for directing a software program specified by the domain ID register to be executed, and to branch to execution of an address translation table miss exception handling by a software program specified by the domain ID register.

According to the arrangement, in case that an access disguised as an access by a domain results in an address translation miss under the management & control by the domain manager, an exception handling to have an entry in association with the address translation miss stored in the address translation table of the domain concerned can be started.

[10] In regard to the data processor as described in [9], in a step to which the CPU has branched, the CPU executes the address translation table miss exception handling, and then sets mode data for specifying the management & control on the domain control register. Thus, after completion of the address translation table miss exception handling, the management & control by the domain manager is resumed, and the process which has been suspended can be continued.

[11] A data processor according to another embodiment of the invention has a CPU operable to run a software program, and an access protection unit operable to provide an access protection to an address space of the CPU based on an operating mode of the CPU. The data processor further includes: a domain ID register on which domain ID data for specifying which operating system to run a software program under is set; a domain control register on which mode data for specifying whether to run the software program specified by the domain ID register or to perform management & control for running the software program specified by the domain ID register is set; and a group of attribute information change registers on which data for changing attribute information of the CPU operating mode provided to the access protection unit for judgment of validity of an access on condition that the domain control register specifies execution of the management & control are set. According to this embodiment, a domain manager can make an access in cooperation with a domain without being prevented by access protection on the domain even while the domain access protection is kept as in the data processors described in [1] to [10].

[12] A data processor according to another embodiment of the invention has a CPU operable to run a software program, and an access protection unit operable to provide an access protection to an address space of the CPU based on an operating mode of the CPU. The operating mode of the CPU includes: an operating mode showing which operating system has control of a domain on which the CPU runs a software program, or a domain manager having control of each domain performs management & control, and an operating mode in which an access based on the management & control is disguised as an access by a predetermined domain. According to this embodiment, a domain manager can make an access in cooperation with a domain without being prevented by access protection on the domain even while the domain access protection is kept as in the data processors described in [1] to [11].

2. Further Detailed Description of the Preferred Embodiments

Now, the embodiments will be described further in detail.
<<Data Processor>>

FIG. 1 shows an example of the configuration of a data processor according to an embodiment of the invention. Although no special restriction is intended, the data processor 1 shown in the drawing is formed on a substrate of semiconductor, such as monocrystalline silicon by the CMOS IC manufacturing technique.

Although no special restriction is intended, the data processor 1 has: CPU 2 which executes a software program; and a memory management unit (MMU) 3 connected to CPU 2 by a bus 100. Outside the data processor 1, a main memory (MEM) 4 is located, which is connected to MMU 3 through a bus 101. MMU 3 has a virtual memory function for translating a virtual address into a physical address, and as an access protection unit, a function for access protection for an address space of CPU 2.

Although no special restriction is intended, as shown in FIG. 1, a system which CPU 2 runs a software program thereby to materialize includes: a first domain, which is a system block (virtual machine) realized by a group of a first operating system and an application software program run under the control of the first operating system; a second domain, which is a system block (virtual machine) materialized by a group of a second operating system and an application software program run under the control of the second operating system; and a domain manager having control of the first and second domains. In the drawing, the first domain is denoted by "OS&App_A", and the second domain is denoted by "OS&App_B", and the domain manager is denoted by DMNMNGR.

In regard to FIG. 1, the express drawing of the configuration of hardware modules including a register set, such as a general-purpose register, and an instruction decoder, which CPU 2 has, is omitted. However, for ease of understanding of the invention, FIG. 1 chiefly shows a register configuration for setting operating modes of the first domain OS&App_A, second domain OSApp_B, and domain manager DMNMNGR, a register configuration for selectively disguising an access by the domain manager DMNMNGR as an access by the first domain OS&App_A or second domain OS&App_B, and the like.

CPU 2 has, as registers showing a mode in which a software program currently under execution is working, a domain ID register XDMID and a domain control register SRX.MDX.

On the domain ID register XDMID, domain ID data DMID for specifying which operating system to run a software program under is set. The domain ID data DMID=0 specifies the first domain OS&App_A, whereas DMID=1 specifies the second domain OS&App_B.

Set on the domain control register SRX.MDX is mode data MD, which shows whether a domain specified by the domain ID register XDMID is to execute a process, or the domain manager DMNMNGR is to manage and control the domains OS&App_A and OS&App_B. The mode data MDX=0 specifies a process by the domain, whereas MDX=1 specifies the management & control by the domain manager DMNMNGR. The processes by domains so specified are broadly classified into Privileged Mode (Priv) in which the operating system is run, and User Mode (User) in which an application software program managed by the operating system is run.

Hence, a mode in which the domain manager DMNMNGR works is set in the case of MDX=1 with the register SRX.MDX, whereas a mode in which the domain OS&App_A or OS&App_B works is set in the case of MDX=0 with the register SRX.MDX. Which domain will work depends on the value set on the register XDMID. In the example of FIG. 1, the domain OS&App_A functions in the condition that the register SRX.MDX holds the value of 0, and the register XDMID keeps the value of 0. The domain OS&App_B works in the condition that the register SRX.MDX holds the value of 0, and the register XDMID has the value of 1. The domain manager DMNMNGR operates in the condition that the register SRX.MDX holds the value of 1.

CPU 2 handles a software program in one of CPU modes consisting of the modes in which the domain OS&App_A, domain OS&App_B, and domain manager DMNMNGR work respectively. Successive programs are run in a time-division manner while the CPU mode is switched according to what program is executed. In other words, the domains OS&App_A and OS&App_B and domain manager DMNMNGR are brought into action in a time-division and pseudo-parallel way.

The programs which the domains OS&App_A and OS&App_B and domain manager DMNMNGR execute, and relevant data are stored in the main memory (MEM) 4. As the programs are run, CPU 2 accesses MEM 4 in sequence. In MEM 4, OS&App_A_Region, OS&App_B_Region and DMNMNGR_Region represent memory regions assigned for storing programs and data for the domains OS&App_A and OS&App_B and domain manager DMNMNGR, respectively.

The reference numerals 110 and 111 each represent an access to MEM 4, which are issued when the domain OS&App_A is executing a software program. The reference numeral 110 denotes a read access from MEM 4 to CPU 2, and 111 denotes a write access from CPU 2 to MEM 4.

The numeral 112 represents attribute information of the CPU operating mode, which is provided to the memory management unit (MMU) 3 accompanying each of the accesses 110 and 111 at access from CPU 2 to MEM 4, and used for access protection by MMU 3. The attribute information is consistent with the operating mode of CPU 2, includes the data DMID=0 and MDX=0, and shows that the access of interest is caused by the domain OS&App_A executing a software program.

MMU 3 judges the validity of an access of interest based on the settings thereof and attribute information conveyed at the time of access, performs an address translation as required, and provides the resulting access address to MEM 4 through the bus 101. Incidentally, in the example shown in FIG. 1, the target for access is the memory region OS&App_A_Region. Specifics of the access protection will be described later in detail.

The reference numerals 120 and 121 represent a read access and a write access to MEM 4, which are issued when the domain OS&App_B is executing a software program. The numeral 122 represents attribute information of the CPU operating mode, which is provided to MMU 3 accompanying each of the accesses 120 and 121 at access, and which is used for access protection by MMU 3. The attribute information is consistent with the operating mode of CPU, includes the data DMID=1 and MDX=0, and shows that the access of interest is caused by the domain OS&App_B executing a software program. In the same way as described above, MMU 3 judges the validity of an access of interest based on the settings thereof and attribute information conveyed at the time of access, performs an address translation as required, and provides the resulting access address to MEM 4 through the bus 101. Incidentally, in the example shown in FIG. 1, the target for access is the memory region OS&App_B_Region.

The reference numerals 130 and 131 represent a read access and a write access to MEM 4, which are issued when the domain manager DMNMNGR is executing a software program. The attribute information, which is provided to MMU 3 accompanying the access 130, is denoted by 132, 133 or 134. The attribute information, which is provided to MMU 3 accompanying the access 131, is denoted by 135, 136 or 137.

The pieces of attribute information 132 and 135 are consistent, in CPU operating mode, with the program-execution mode of the domain manager DMNMNGR, include the data DMID taking an appropriate number, and MDX=1, and show that the accesses of interest are caused by the domain manager DMNMNGR executing a software program. The pieces of attribute information are each labeled with XVS in FIG. 1.

The pieces of attribute information 133 and 136 are inconsistent, in CPU operating mode, with the program-execution mode of the domain manager DMNMNGR, include the data DMID=1 and MDX=0, and disguise the accesses of interest as those caused by the domain OS&App_B executing a software program. The pieces of attribute information are each represented by "User/Priv, DMID=1" in FIG. 1.

The pieces of attribute information 134 and 137 are inconsistent, in CPU operating mode, with the program-execution mode of the domain manager DMNMNGR, include the data DMID=0 and MDX=0, and disguise the accesses of interest as those caused by the domain OS&App_A executing a software program. The pieces of attribute information are each represented by "User/Priv, DMID=0" in FIG. 1.

Which type of attribute information accompanies each of the accesses 130 and 131 depends on the settings of the registers XRDMID, XWDMID, SRX.RDAX and SRX.WDAX. The registers XRDMID, XWDMID, SRX.RDAX and SRX.WDAX are examples of an attribute information change register which attribute-change data for changing the attribute information concerning the operating mode of CPU 2 when the management & control is specified by a value held in the domain control register SRX.MDX is set on. Incidentally, the operating mode of CPU 2 is decided by what are set on the domain control register SRX.MDX and domain ID register XDMID. The reference numeral 140 in FIG. 1 denotes a logic, which is presented in a clear graphic representation. The logic 140 accepts the input of access attribute information of an original form created by the domain OS&App_A or OS&App_B, or domain manager DMNMNGR according to the CPU mode, and changes the input original form of attribute information (i.e. original attribute information) according to settings of the attribute information change registers XRDMID, XWDMID, SRX.RDAX and SRX.WDAX into attribute information (i.e. pseudo-attribute information), which allows MMU 3 to disguise an access as one by the domain OS&App_A or OS&App_B. The logic 140 may be materialized as part of a control logic in CPU 2, for example, which generates a control signal as a result of decode of an instruction or according to a value of an inside register.

MMU 3 has an address translation table. In the table, the following are stored rewritably: a translation pair of a virtual address and a physical address corresponding to the virtual one; and entry data containing the attribute information of the operating mode of CPU 2 (corresponding to the original attribute information thereof), in which an access to a virtual address of interest is allowed. MMU 3 uses a virtual address input accompanying the access 110, 111, 120, 121, 130 or 131 from CPU 2 to associatively reads entry data, and judges whether or not the attribute information contained in the entry data thus read matches the attribute information supplied together with a virtual address accompanying an access concerned. If a match is found, MMU 3 outputs a corresponding physical address to MEM 4. If not, MMU 3 suspends the access, and makes a request to CPU 2 for exception handling at access protection violation.

MMU 3 disguises an access from the domain manager DMNMNGR, which performs the management & control according to settings of the attribute information change registers XRDMID, XWDMID, SRX.RDAX and SRX.RDAX, as an access by the domain OS&App_A or OS&App_B. Therefore, the domain manager DMNMNGR can make an access in cooperation with the domain OS&App_A or OS&App_B without being prevented by access protection on the domain even while the access protection for an access by the domain is kept. The detail of this will be further described below.

<<Register Configuration in Connection with CPU Mode and its Attribute Information Change>>

FIG. 2 shows an example of the layout of the registers SRX.MDX, SRX.RDAX and SRX.WDAX. The registers SRX.MDX, SRX.RDAX and SRX.WDAX as described above are each assigned to a specific bit of a register SRX in reality.

Although no special restriction is intended, the register SRX has a length of 32 bits, and it can be read/written in response to a register-access instruction for the register SRX, which is to be described later. Specifically, the 3rd bit, 9th bit and 8th bit correspond to the registers SRX.MDX, SRX.RDAX and SRX.WDAX respectively. With the other bits, zero is always read therefrom, and writes on the bits are ignored.

FIG. 3 presents descriptions of instructions for controlling the register SRX. The instruction "LDC Rm,SRX" with an instruction code of H'4m89, in which "m" of the instruction code H'4m89 takes on a value of 0 to F in hexadecimal notation, or 0 to 15 in decimal notation, is an instruction for transferring a value from a general-purpose register #m (Rm) of CPU 2 to the register SRX. The character string "XVS" in EXECUTION PRIVILEGE shows that the instruction can executed in an operating mode of the domain manager.

The instruction "STC SRX,Rn" with an instruction code of H'4n88, in which "n" of the instruction code H'4n88 takes on a value of 0 to F in hexadecimal notation, or 0 to 15 in decimal notation, is an instruction for transferring a value from the register SRX to a general-purpose register #n (Rn) of CPU 2. This instruction has the same execution privilege as the instruction "LDC Rm,SRX" has.

The instruction "TRAPX #imm4" with an instruction code of H'0iCB, in which "i" of the instruction code H'0iCB takes on a value of 0 to F in hexadecimal notation, or 0 to 15 in decimal notation, is an instruction for setting one (1) on the register SRX.MDX. The character string "User/Priv" in EXECUTION PRIVILEGE shows that the instruction can executed in an operating mode of a domain. The instruction can be executed by any of the domain and domain manager.

Using the instructions "LDC Rm,SRX" and "STC SRX, Rn", values of the registers SRX.MDX, SRX.RDAX and SRX.WDAX can be controlled from a software program running on the domain manager.

Further, using an instruction "TRAPX #imm4", the register SRX.MDX can be set to one (1) from a software program working on each domain. This means the software program put in execution is switched from one working on a domain to another running on the domain manager.

FIG. 4 shows examples of the allocations of the registers XDMID, XRDMID and XWDMID. To the registers, memories of 32-bit length are mapped, and the addresses of H'FF000004, H'FF000C08 and H'FF000C0C in hexadecimal notation are assigned respectively. Using instructions of reading and writing MEM 4, the registers can be accessed from CPU 2. However, in access to each of the registers, an actual access from CPU 2 to MEM 4 is not issued.

The zeroth bit of the register of the address H'FF000004 corresponds to the register XDMID. Further, the zeroth bits of the registers of the addresses H'FF000008 and H'FF000C0C correspond to the registers XRDMID and XWDMID, respectively. With the other bits, zero (0) is always read therefrom, and writes on the bits are ignored.

<<CPU Mode and Access Mode Corresponding to Register Settings>>

Figures 5, 6:
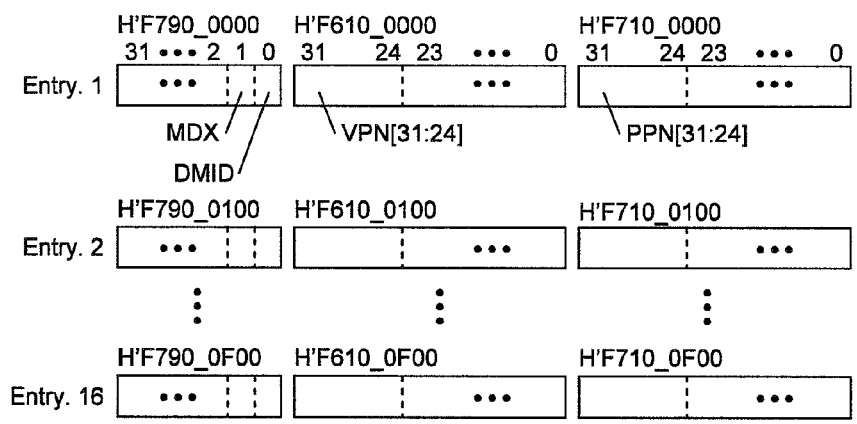
FIG. 5 is a table showing relations among settings of the registers SRX.MDX, SRX.RDAX, SRX.WDAX, XDMID, XRDMID and XWDMID and CPU modes and access modes corresponding to the settings.
FIG. 6 is a diagram showing an example of the structure of an address translation table having an address translation rule for MMU set thereon.

The relations between set conditions of the registers SRX.MDX, SRX.RDAX, SRX.WDAX, XDMID, XRDMID and XWDMID and CPU and access modes corresponding to the conditions are summarized in the list of FIG. 5. The CPU mode refers to an operating mode of CPU. The access mode represents an operating mode of CPU viewed from the standpoint of MMU 3 at the time of judgment of the validity of an access.

The row 501 shows the condition that the register SRX.MDX holds a value of zero (0). The operating modes of the domains OS&App_A and OS&App_B fit the condition. The CPU and access modes are both made the mode of the domain indicated by the register XDMID.

The row 502 shows the condition that the registers SRX.MDX, SRX.RDAX and SRX.WDAX hold the value "1". The operating mode of the domain manager fits the condition. The CPU and access modes are both made the mode of the domain manager DMNMNGR. This mode corresponds to the mode of an access accompanied by the attribute information 132 or 135, which is included by the read and write accesses 130 and 131 to the MEM 4 issued during the time when the domain manager DMNMNGR is running a software program, and described above with reference to FIG. 1.

The row 503 shows the condition that the registers SRX.MDX, SRX.RDAX and SRX.WDAX hold "1", "0" and "1" respectively. In this case, the CPU mode is the operating mode of the domain manager. However, the access mode is arranged so that a read access is disguised as an access from the domain indicated by the register XRDMID, whereas a write access is made by the domain manager DMNMNGR.

Further, the condition will be checked against the configuration of FIG. 1 here. The condition shown by the row 503 applies to an access with the attribute information 134 (when the register XRDMID holds "0") or the attribute information 133 (when the register XRDMID has "1") according to the value held by the register XRDMID, in terms of the read access 130. However, in terms of the write access 131, it corresponds to an access with attribute information 135.

Again, a reference is made to FIG. 5 here. The row 504 shows the condition that the registers SRX.MDX, SRX.RDAX and SRX.WDAX hold "1", "1" and "0" respectively. In this case, the CPU mode is the operation mode of the domain manager. However, in regard to the access mode, a write access is disguised as an access from the domain indicated by the register XWDMID. However, a read access is made by the domain manager DMNMNGR.

Further, the condition will be checked against the configuration of FIG. 1 here. This condition applies to an access with the attribute information 132 in terms of the read access 130. However, in terms of the write access 131, the condition applies to an access with the attribute information 137 (when the register XWDMID holds "0") or the attribute information 136 (when the register XWDMID has "1") according to the value held by the register XWDMID.

Again, a reference is made to FIG. 5 here. The row 505 shows the condition that the registers SRX.MDX, SRX.RDAX and SRX.WDAX hold "1", "0" and "0" respectively. In this case, the CPU mode is the operating mode of the domain manager. However, with the access mode, a read access is disguised as an access from the domain indicated by the register XRDMID, and a write access is disguised as an access from the domain indicated by the register XWDMID.

Further, the condition will be checked against the configuration of FIG. 1 here. In terms of the read access 130, this condition applies to an access with the attribute information 134 (when the register XRDMID holds "0") or the attribute information 133 (when the register XRDMID has "1") according to the value held by the register XRDMID. However, in terms of the write access 131, the condition applies to an access with the attribute information 137 (when the register XWDMID holds "0") or the attribute information 136 (when the register XWDMID holds "1") according to the value held by the register XWDMID.

Now, turning to the CPU and access modes as set according to the conditions shown by the rows 503 to 505 of FIG. 5 particularly, it can be seen that by use of the settings, an access can be issued from a software program running on the domain manager DMNMNGR as if a software program working on a domain makes the access. A software program running on the domain manager DMNMNGR uses the settings of the CPU and access modes at data exchange between domains appropriately.

Thus, by changing attribute information so as to disguise a read access from the domain manager DMNMNGR as a read access from the first domain OS&App_A, and a write access from the domain manager DMNMNGR as a write access from the second domain OS&App_B, for example, the domain manager DMNMNGR can read data from a memory region OS&App_A_Region to which the first domain OS&App_A provides the access protection, and write the read data into a memory region OS&App_B_Region to which the second domain OS&App_B affords the access protection.

<<Address Translation Table of MMU>>

FIG. 6 shows an example of the structure of an address translation table, on which an address translation rule for MMU 3 is set. Although no special restriction is intended, the address translation table is formed by a register which has been subjected to memory mapping like the register XDMID. The address translation table can be accessed with instructions by which usual read and write are conducted. A group of address translation settings can be made by a combination of registers of the addresses H'F7900000, H'F6100000 and H'F7100000, and the group of address translation setting is referred to as "Entry".

A portion ranging from the bit #31 to bit #24 of the register of the address H'F6100000, i.e. VPN[31:24], corresponds to a virtual address issued by CPU 2, i.e. a portion, ranging from the bit #31 to bit #24, of an address on the bus 100.

MDX and DMID of the bit #1 and bit #0 of the register of the address H'F7900000 accompany an access issued by CPU 2, which correspond to the operating mode (CPU mode) of CPU at that time.

A portion ranging from the bit #31 to bit #24 of the register of the address H'F7100000, i.e. PPN[31:24] corresponds to a portion ranging from the bit #31 to bit #24 of a physical address provided from MMU 3 to the MEM 4, i.e. an address conveyed through the bus 101.

With regard to portions of the registers of the addresses H'F6100000 and H'F7100000, ranging from the bit #23 to bit #0, and a portion of the address H'F7900000, ranging from the bit #31 to bit #2, zero (0) is always read therefrom, and a write on the portions is ignored at all times.

Also, a combination of addresses H'F7900100, H'F6100100 and H'F7100100 forms one entry. Therefore, combinations of addresses up to H'F7900F00, H'F6100F00, and H'F7100F00 form 16 entries Entry_1 to Entry_16 in total likewise.

In address translation, MMU 3 compares a portion of the bit #31 to bit #24 of a virtual address, i.e. an address notified through the bus 100 from CPU 2, and pieces of attribute information as the access mode with VPN[31:24] MDX and DMID of all of the 16 entries. If a match is found for at least one of the 16 entries as a result of the comparison, MMU 3 replaces the portion of the bit #31 to bit #24 of the address notified through the bus 100 with PPN[31:24] of the entry which has been found to match, and outputs PPN[31:24] to the bus 101. If there is no entry having VPN[31:24] which matches the virtual address, MMU 3 makes a request to CPU 2 for exception handling of an address translation miss thereby to have CPU 2 add an entry fitting the conditions. Even after an entry having VPN[31:24] matching the virtual address has been found, if MDX and DMID of the entry do not match with attribute information of the access mode, MMU 3 makes a request to CPU 2 for exception handling of an access protection violation thereby to suspend the access.

Now, turning to entries of the address translation table of MMU 3, in case that the domains OS&App_A and OS&App_B, and domain manager DMNMNGR use respective virtual memories, for example, the entries utilized by software programs of the domains and domain manager must be assorted according to the software programs. MDX and DMID of the entries are prepared for such assortment.

It is assumed here that the domain OS&App_A works using Entries #1 to #4, for example. The settings of VPN[31:24] and PPN[31:24] of each of Entries #1 to #4 are written therein from a software program running on the domain OS&App_A. Particularly, a virtual address space managed by the domain OS&App_A functions by not only making four sets of translation settings of Entries #1 to #4, but also appropriately replacing the setting in case that an access which matches no entry is issued. Therefore, translation settings of the four groups of Entries #1 to #4 are changed by a software program working on the domain OS&App_A dynamically.

Now, it is considered the case that at such change, the domain manager DMNMNGR accesses the main memory region OS&App_A_Region for the domain OS&App_A. As a software program working on the domain OS&App_A writes the settings of Entries #1 to #4 on an as-needed basis, an access to the main memory region OS&App_A_Region which the domain manager DMNMNGR tries accessing is not necessarily enabled at all times.

Therefore, when accessing the main memory region OS&App_A_Region of the domain OS&App_A, the domain manager DMNMNGR must use a translation setting routine of Entries #1 to #4 included in the software program of the domain OS&App_A. Otherwise, without the routine, the domain manager DMNMNGR must make the translation setting from management data of the whole virtual address space for management of the domain OS&App_A using a portion other than Entries #1 to #4 by itself.

The latter means complicates the software program of the domain manager DMNMNGR, and requires that the address translation table of MMU 3 should have more entries. Therefore, it is desirable to follow the former means, namely to use the translation setting routine of the domain OS&App_A.

A requirement for the start of the translation setting routine is that in MMU 3, the address translation table does not have an entry which matches the virtual address. Hence, even in case that the domain manager DMNMNGR accesses the main memory region OS&App_A_Region of the domain OS&App_A, the access mode (attribute information) is falsified as if the domain OS&App_A made the access, as described above. As a result, the operating system for the domain OS&App_A is diverted and as such, CPU 2 can execute the exception handling of address translation miss.

<<Data Transfer Between Domains>>

Figure 7:
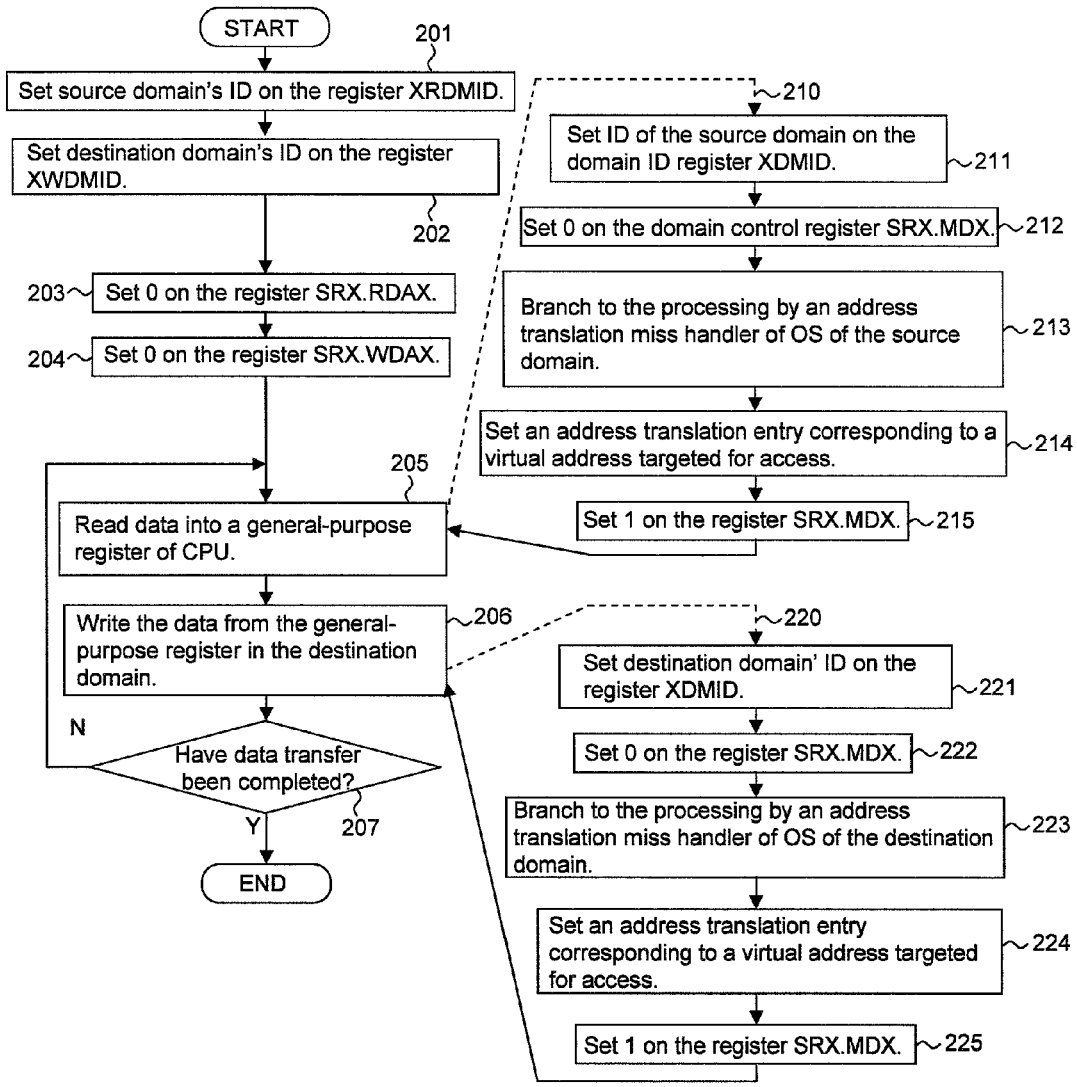
FIG. 7 is a flowchart showing an example of operation in the case of conducting data transfer between domains under control of the domain manager with the CPU mode set to XVS (MDX=1) in the data processor.

FIG. 7 shows an example of the operation flowchart of data transfer between the domains under the control of the domain manager in the data processor 1 of the invention on condition that the CPU mode is XVS (MDX=1). Here, one of the domains OS&App_A and OS&App_B is referred to as "source domain" and the other is referred to as "destination domain".

The operation which will be described with reference to FIG. 7 is premised on the CPU mode of XVS (MDX=1), which is not noted in the drawing. The data transfer operation is performed following a procedure including Steps 201 to 204 for preparation, and Steps 205 and 207 which are repeated until the transfer is finished. Steps 211 to 215 are processing steps for executing the exception handling in case that an address translation miss occurs in Step 205. Likewise, Steps 220 to 225 are processing steps for executing the exception handling in case that an address translation miss occurs in Step 206.

The domain manager DMNMNGR sets ID of a source domain on the register XRDMID in Step 201, sets ID of destination domain on the register XWDMID in Step 202, sets zero on the register SRX.RDAX in Step 203, and sets zero on the register SRX.WDAX in Step 204. In this way, the access mode is set to disguise a read access from the domain manager DMNMNGR as a read access from the source domain, and a write access from the domain manager DMNMNGR as a write access from the destination domain as described about the condition of the row 505 of FIG. 5 on condition that the CPU mode is XVS.

In Step 205, data of the source domain is read into a general-purpose register of CPU 2. In this step, thanks to the functions of the registers SRX.RDAX and XRDMID, the operating mode of the source domain is set for the access mode without switching the operating mode, and thus an access which involves attribute information targeted for a judgment of match with an entry by MMU 3, namely a judgment of attribute information matching for access protection, is disguised as an access from the source domain.

In Step 206, the data, which has been read into the general-purpose register of CPU 2 in Step 205, is written in the destination domain. In this step, thanks to the functions of the registers SRX.WDAX and XWDMID, the operating mode of the destination domain is set for the access mode without switching the operating mode, and thus an access which involves attribute information targeted for a judgment of match with an entry by MMU 3, namely a judgment of attribute information matching for access protection, is disguised as an access from the destination domain.

In Step 207, a judgment is made on whether the data to transfer have been all transferred. If not, the execution is turned back to Step 205. By iteration of Steps 205 to 207, the data transfer is completed.

If there is no entry used for the judgment of match with an entry by MMU 3 in Step 205, the operation flow branches to a branch flow 210. Then, ID of the source domain is set on the domain ID register XDMID (in Step 211). Further, the value of 0 is set on the domain control register SRX.MDX (in Step 212), and the setting of the CPU mode is changed into the mode of the source domain. Thus, the execution of processing under the operating system of the source domain is enabled. Then, a request for address translation table miss exception causes the operation flow to branch to the processing by an address translation miss handler of the operating system of the source domain (in Step 213). Consequently, an address translation entry corresponding to a virtual address targeted for access and involved with the address translation miss is set by MMU 3 (in Step 214). Thereafter, the value of the register SRX.MDX is set to one again (in Step 215), and the CPU mode is turned back to XVS (MDX=1), whereby the processing of Step 205, which has been suspended, can be continued.

If there is no entry used for the judgment of match with an entry by MMU 3 in Step 206, the operation flow branches to a branch flow 220. Then, ID of the destination domain is set on the domain ID register XDMID (in Step 221). Further, the value of 0 is set on the domain ID control register SRX.MDX (in Step 222), and the setting of the CPU mode is changed into the mode of the destination domain. Thus, the execution of processing under the operating system of the destination domain is enabled. Then, a request for address translation table miss exception causes the operation flow to branch to the processing by an address translation miss handler of the operating system of the destination domain (in Step 223). Consequently, an address translation entry corresponding to a virtual address targeted for access and involved with the address translation miss is set by MMU 3 (in Step 224). Thereafter, the value of the register SRX.MDX is set to one again (in Step 225), and the CPU mode is turned back to XVS (MDX=1), whereby the processing of Step 206, which has been suspended, can be continued.

Thus, the domain manager DMNMNGR can read data from a memory region, e.g. the region OS&App_A_Region, to which a source domain, such as the domain OS&App_A, provides access protection, and write the data so read to in a memory region, e.g. the region OS&App_B_Region, to which a destination domain, such as the domain OS&App_B, provides access protection.

Figure 8:
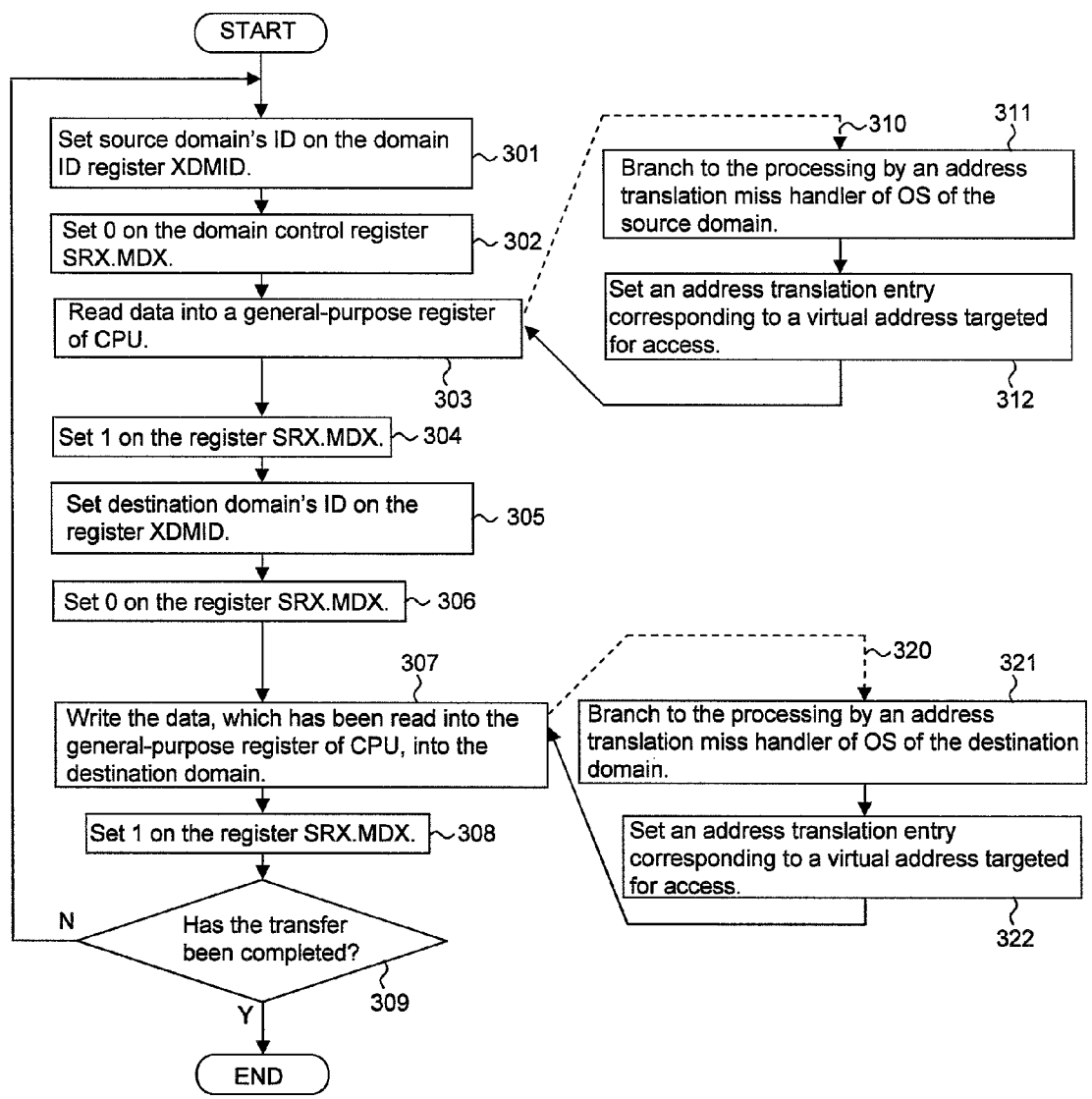
FIG. 8 is a flowchart showing, as a comparative example, a procedure of data transfer between domains, in which the registers SRX.RDAX, SRX.WDAX, XRDMID and XWDMID are not adopted, and the CPU mode is coincident with the access mode without fail.

FIG. 8 shows, as a comparative example, another operation flowchart of data transfer between domains, in which the registers SRX.RDAX, SRX.WDAX, XRDMID, and XWDMID are not adopted, and the CPU mode is coincident with the access mode without fail.

In the operation, a series of processing from Steps 301 to 309 are repeated until the transfer is finished. In the Steps 301 to 303, the operating mode is switched from the domain manager's mode to the source domain's one, and data is read into a general-purpose register of CPU. The reason why the operating mode must be switched to the source domain's mode is that the judgment of match with an entry by MMU 3 must be performed in response to an access from the source domain.

In Step 304, the domain manager is put in charge of processing, again. At the time, it is necessary to use the instruction TRAPX #imm4 to switch the operating mode. This is because a program running on the source domain cannot rewrite the domain control register SRX.MDX directly.

In Steps 305 to 307, the operating mode is switched from the mode of the domain manager to that of the destination domain, and the data which has been read into the general-purpose register of CPU in Step 303, is written in the destination domain. Also, in this case, for convenience of execution of the judgment of match with an entry by MMU 3, the operating mode must be the mode of the destination domain. Further, the domain manager is again put in charge of processing in Step 308.

In Step 309, a judgment is made on whether the data to transfer are all have been all transferred. If not, the execution is turned back to Step 301. By iteration of the steps, the data transfer from a source domain to a destination domain is completed.

If there is no entry used for the judgment of match with an entry by MMU 3 in Step 303, the operation flow branches to a branch flow 310. Then, a request for address translation table miss exception causes the operation flow to branch to the processing by an address translation miss handler of the operating system of the source domain (in Step 311). Consequently, an address translation entry corresponding to a virtual address targeted for access and involved with the address translation miss is set by MMU 3 (in Step 312). Thereafter, the processing of Step 303, which has been suspended, can be continued.

If there is no entry used for the judgment of match with an entry by MMU 3 in Step 307, the operation flow branches to a branch flow 320. Then, a request for address translation table miss exception causes the operation flow to branch to the processing by an address translation miss handler of the operating system of the destination domain (in Step 321). Consequently, an address translation entry corresponding to a virtual address targeted for access and involved with the address translation miss is set by MMU 3 (in Step 322). Thereafter, the processing of Step 307, which has been suspended, can be continued.

The following are found from a comparison between the data transfer operation according to the invention as described with reference to FIG. 7, and that according to the comparative example of FIG. 8. The data transfer according to the invention is smaller in the number of repeated steps, in which only three steps, namely Steps 205 to 207 are repeated. Further, the invention achieves a higher rate of data transfer in comparison to the latter example of FIG. 8 because it never needs the switching of the operating mode during the iteration of the steps. With the number of steps necessary for recovery at the occurrence of an address translation miss, the comparative example of FIG. 8 is smaller than the example of FIG. 7; the number is two in the example of FIG. 8, and five in the example of FIG. 7. However, the steps of the branch flows 210 and 220, and the steps of the branch flows 310 and 320 are performed only when an address translation miss occurs, and they need not to be conducted each time of data transfer from a source to a destination. Therefore, even taking account of the processing owing to an address translation miss, the example according to the invention as described with reference to FIG. 7 can achieve a higher rate of data transfer in comparison to the example of FIG. 8.

While the invention made by the inventor has been described above based on the embodiments specifically, it is not limited to the embodiments. It is obvious that various changes and modifications thereof may be made without departing the scope thereof.

For example, the invention is applicable to a data processor with multiple CPUs. Also, the address translation table may consist of an associative memory structure TLB (Translation Look-aside Buffer). A data processor to which the invention can be applied is not limited to a one-chip data processor, and it may be multi-chip one. Such multi-chip data processor can be materialized as a module device in a system-in-package form, which has multiple chips packed into one package.

What is claimed is:

1. A data processor having a CPU operable to run a software program, and an access protection unit operable to provide an access protection to an address space of the CPU based on an operating mode of the CPU, comprising:
    a domain ID register on which domain ID data for specifying which operating system to run a software program under is set;
    a domain control register on which mode data for specifying whether to run the software program specified by the domain ID register or to execute management & control for running the software program specified by the domain ID register is set; and
    a group of attribute information change registers on which attribute-change data for changing attribute information of the CPU operating mode depending on settings of the domain control register and domain ID register on condition that the domain control register specifies execution of the management & control are set,
    wherein the access protection unit receives attribute information from the CPU and judges validity of an access, provided that the attribute-change data set on the attribute information change register are incorporated in the attribute information.

2. The data processor according to claim 1, wherein the attribute-change data include first data for switching the attribute information from the management & control to the run of the software program specified by the domain ID register, and second data for specifying which domain ID to switch the attribute information to.

3. The data processor according to claim 2, wherein the first and second data are data for independently specifying changes of the attribute information for each of read and write accesses.

4. The data processor according to claim 1, wherein the CPU has an instruction set including a given load instruction for loading data into the domain ID register, domain control register, and attribute information change register, and
    the load instruction is executed on condition that the management & control is specified by the domain control register.

5. The data processor according to claim 4, wherein the instruction set of the CPU includes a given store instruction for storing data from the domain ID register, domain control register and attribute information change register, and the store instruction is executed on condition that the management & control is specified by the domain control register.

6. The data processor according to claim 5, wherein the instruction set of the CPU includes a trap instruction for setting mode data for specifying the management & control on the domain control register, and then causing a request for an exception handling, and execution of the trap instruction is independent of a setting of the domain control register.

7. The data processor according to claim 1, wherein the access protection unit is an MMU (Memory Management Unit) which has attribute information of an operating mode of a CPU permitted to access a virtual address, and which is operable to translate a virtual address of a CPU into a physical address using a translation pair of the virtual address concerned and physical address, and to judge validity of an access based on whether or not attribute information of an operating mode of a CPU permitted to access to the virtual address of the translation pair matches attribute information of an operating mode of a CPU making the access to the virtual address.

8. The data processor according to claim 7, wherein the MMU has an address translation table, and in the address translation table, entry data containing a translation pair of virtual and physical addresses, and attribute information of an operating mode of a CPU permitted to access a virtual address concerned are stored rewritably.

9. The data processor according to claim 8, wherein on condition that attribute information is changed according to attribute-change data set on the attribute information change register, and the CPU performs the management & control according to a setting of the domain control register, if the MMU causes a request for address translation table miss exception handling in response to occurrence of an address translation miss, the CPU responds to the request for address translation table miss exception handling, thereby e.g. to set, on the domain ID register, domain ID data for specifying a domain ID to change the attribute information to by use of the attribute information change register, to set, on the domain control register, mode data for directing a software program specified by the domain ID register to be executed, and to branch to execution of an address translation table miss exception handling by a software program specified by the domain ID register.

10. The data processor according to claim 9, wherein in a step to which the CPU has branched, the CPU executes the address translation table miss exception handling, and then sets mode data for specifying the management & control on the domain control register.

11. A data processor having a CPU operable to run a software program, and an access protection unit operable to provide an access protection to an address space of the CPU based on an operating mode of the CPU, comprising:

a domain ID register on which domain ID data for specifying which operating system to run a software program under is set;

a domain control register on which mode data for specifying whether to run the software program specified by the domain ID register or to perform management & control for running the software program specified by the domain ID register is set; and a group of attribute information change registers on which data for changing attribute information of the CPU operating mode provided to the access protection unit for judgment of validity of an access on condition that the domain control register specifies execution of the management & control are set.

12. A data processor having a CPU operable to run a software program, and an access protection unit operable to provide an access protection to an address space of the CPU based on an operating mode of the CPU, wherein the operating mode includes: an operating mode showing which operating system has control of a domain on which the CPU runs a software program, or a domain manager having control of each domain performs management & control, and an operating mode in which an access based on the management & control is disguised as an access by a predetermined domain.

* * * * *